D. WILLIAMS.
TREE PROTECTOR.
APPLICATION FILED MAR. 21, 1921.
1,415,134.
Patented May 9, 1922.
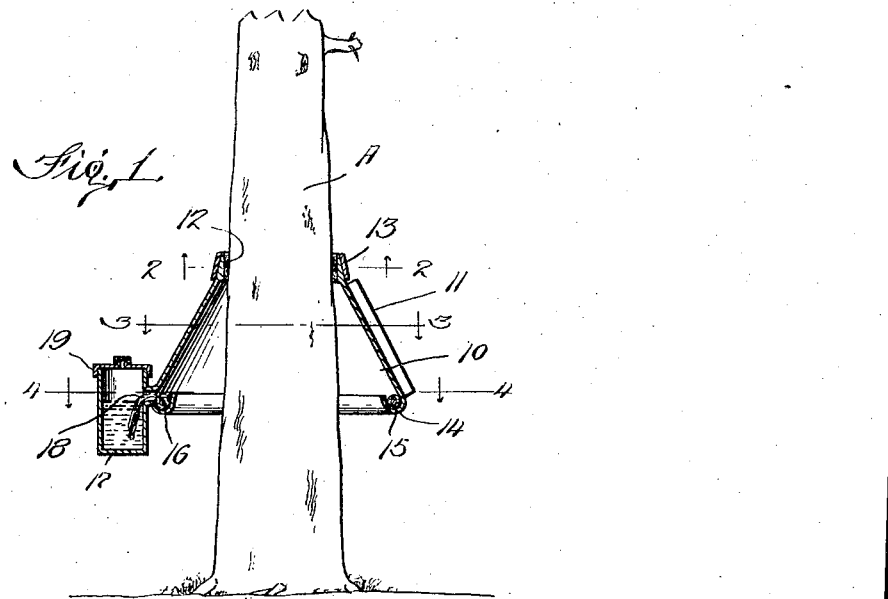
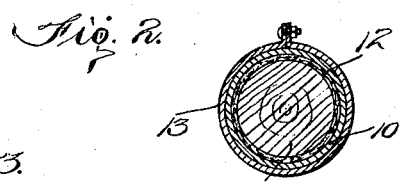
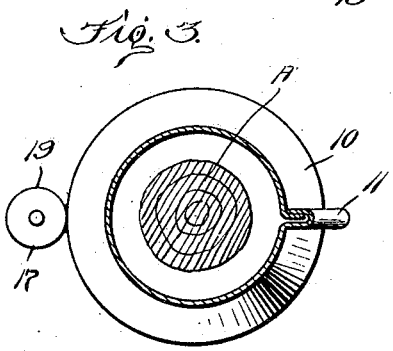
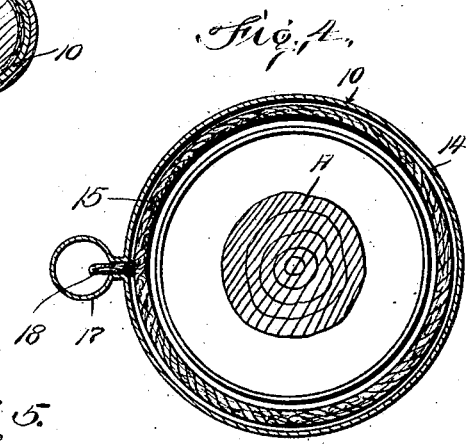
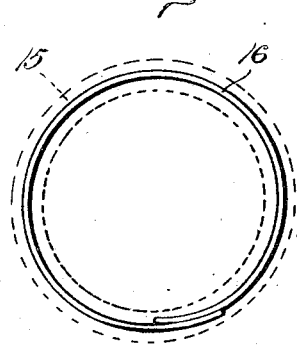
Inventor:
David Williams.
Watson E. Coleman
Attorney.

UNITED STATES PATENT OFFICE.

DAVID WILLIAMS, OF NEW ORLEANS, LOUISIANA.

TREE PROTECTOR.

1,415,134.  Specification of Letters Patent.  Patented May 9, 1922.

Application filed March 21, 1921. Serial No. 454,107.

*To all whom it may concern:*

Be it known that I, DAVID WILLIAMS, a citizen of the United States, residing at New Orleans, in the parish of Orleans and State of Louisiana, have invented certain new and useful Improvements in Tree Protectors, of which the following is a specification, reference being had to the accompanying drawings.

This invention relates to means for preventing insects from crawling up the trunk of a tree and so into the branches and onto the leaves of the tree, and particularly to that class of devices of this character which embody a shield surrounding the trunk of the tree and so arranged as to prevent the insects from crawling past the shield.

The general object of my invention is to provide a device of this character which is very simple, convenient, may be readily applied to trees, and which will effectively prevent insects from climbing up the trunk of the tree beyond a short distance from the ground.

A further object is to provide a construction of this character in which a conoidal shield is provided, which at its smaller end surrounds the trunk of the tree tightly and which carries at its smaller end a pad of cotton, wool or other suitable material which will impede and prevent the passage of insects, and which at its lower end is formed to provide a gutter adapted to contain an insecticide or to contain a wicking soaked in insecticide and beyond which the insects cannot pass.

And a further object is to provide a device of this character with means whereby the wicking may be kept saturated with insecticide or with other liquid.

Another object is to provide means whereby the wicking in said trough or gutter will fit tightly against the bottom of the gutter so as to prevent the wicking from moving out of its proper position and prevent insects from passing the wicking without coming in contact therewith.

Other objects will appear in the course of the following description.

My invention is illustrated in the accompanying drawings, wherein:—

Figure 1 is a vertical sectional view of my tree protector showing it in applied position;

Figure 2 is a section on the line 2—2 of Figure 1;

Figure 3 is a section on the line 3—3 of Figure 1;

Figure 4 is a section on the line 4—4 of Figure 1;

Figure 5 is a plan view of the resilient ring 16;

Referring to these drawings, it will be seen that my device comprises a downwardly flaring or substantially conoidal shield 10 which is of thin metal. The shield is formed of one sheet of metal bent in a circle, the margins of the sheet being connected by the seam 11. This seam may be of any suitable construction, and by bending the seam either to a greater or less degree, the cone may be caused to relatively tightly bind upon the tree or to bind the cotton pad 12 against the tree. This cotton pad 12 is disposed between the upper tapering end of the cone and the tree trunk A. This cotton pad is wrapped around the trunk of the tree at the place desired and then the cone fitted over the cotton pad and tightened thereon so that the cone is supported by the tree trunk.

Disposed over the small upper end of the cone is a band 13. This band is so arranged, as for instance by having its ends flanged and connected by a nut and bolt, that in winter this band may be expanded and the protector removed, or the protector left on if desired without, however, hindering the growth of the tree. The lower end of the shield 10 is inwardly flanged, as at 14, to form a gutter on the inside face of the cone and in this gutter there is arranged a band of lamp wick or like wicking 15. This wicking is preferably wrapped around a resilient wire 16 which acts to expand the wicking and hold it in close engagement with the wall of the gutter, the resilient wire 16 acting to prevent the wick from moving out of its proper position and holding it so tightly against one or both walls of the gutter that no insect can pass between the wicking and the wall of the gutter but must come in contact with the wicking itself. This wicking is kept saturated with some insecticide, as for instance kerosene, or with a viscid oil or liquid of like nature, by means of a can or container 17 having a passage communicating with the gutter 14, through which a portion 18 of the wicking passes, thus acting by capillary attraction to draw the oil upward to the wicking and keep it thoroughly saturated at all times. This cone is covered by a screw-threaded top 19 having the usual filling opening or a vent.

It will be seen that the downwardly flaring shield or protector 10 overhangs the gutter 14 so as to thoroughly protect the latter and protect the wick so that rain cannot dilute or wash out the oil of the wicking and fill the gutter. The cotton pad 12 is protected by the very close engagement of the upper end of the protector with the tree trunk, the bulk of the cotton pad being below the upper end of the shield 10. By disposing this gutter 14 beneath the overhanging wall of the part 10, leaves, trash, etc., are prevented from accumulating within the gutter and forming a bridge over which insects might walk.

It will be seen that with this construction, insects proceeding up the tree trunk will be blocked by the tight fitting cotton pad 12 and will be prevented from passing this pad and will be obliged to move down the inner face of the shield 10 until they eventually arrive at the gutter 14. In attempting to pass this gutter they will come in contact with the insecticide, oil or other liquid with which the wick is saturated, and will either be unable to pass this point or will be killed by the insecticide.

While I have illustrated certain specific features of my invention, I do not wish to be limited thereto, as it is obvious that many changes might be made in the details of construction and arrangement of parts without departing from the spirit of the invention.

I claim:—

1. A tree protector comprising a conoidal body of sheet metal having means at its upper end whereby it may be clamped around a tree, the lower margin of the body being inwardly and upwardly turned to form an insecticide-containing trough disposed entirely beneath the body.

2. A tree protector comprising a conoidal body of sheet metal having means at its upper end whereby it may be clamped around a tree, the lower margin of the body being inwardly and upwardly turned to form an insecticide-containing trough disposed entirely beneath the body, a pad of fibrous material disposed on the inside of the smaller or upper end of the body, and an absorbent wicking disposed in said trough.

3. A tree protector of the character described comprising an approximately conoidal body of thin sheet metal adapted to be clamped around the tree trunk, a pad of fibrous material disposed at the small end of the body on the inside thereof, a clamping band disposed around the small end of the body on the exterior thereof whereby it may be held against the tree trunk, the lower margin of the body being upwardly and inwardly turned to form a trough disposed entirely beneath the body, an absorbent wicking disposed in the trough, and a container attached to the body and having a passage leading to the trough.

4. A tree protector including a conoidal body of thin sheet metal adapted to be clamped around the tree trunk, the lower margin of the body being upwardly and inwardly turned to form a trough, a resilient wire disposed in the trough, and wicking wrapped around said wire, the wire acting to hold the wicking in contact with a wall of the trough.

In testimony whereof I hereunto affix my signature.

DAVID WILLIAMS.